(12) United States Patent
Ito et al.

(10) Patent No.: US 11,524,367 B2
(45) Date of Patent: Dec. 13, 2022

(54) GLASS PLATE AND MANUFACTURING METHOD OF GLASS PLATE

(71) Applicant: AGC Inc., Chiyoda-ku (JP)

(72) Inventors: Jun Ito, Tokyo (JP); Ikuo Nagasawa, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 761 days.

(21) Appl. No.: 16/538,895

(22) Filed: Aug. 13, 2019

(65) Prior Publication Data

US 2019/0358750 A1 Nov. 28, 2019

Related U.S. Application Data

(63) Continuation of application No. PCT/JP2018/002937, filed on Jan. 30, 2018.

(30) Foreign Application Priority Data

Feb. 21, 2017 (JP) .............................. JP2017-030506

(51) Int. Cl.
*B23K 26/362* (2014.01)
*B23K 26/38* (2014.01)
(Continued)

(52) U.S. Cl.
CPC .......... *B23K 26/55* (2015.10); *B23K 26/0622* (2015.10); *B23K 26/359* (2015.10);
(Continued)

(58) Field of Classification Search
CPC ...... B23K 26/362; B23K 26/38; B23K 26/53; B23K 26/55; B23K 2103/54
See application file for complete search history.

(56) References Cited

U.S. PATENT DOCUMENTS

| 10,029,940 B1 | 7/2018 | Geerlings et al. |
| 2004/0144231 A1 | 7/2004 | Hanada et al. |
| | (Continued) | |

FOREIGN PATENT DOCUMENTS

| JP | 2004-217492 A | 8/2004 |
| JP | 2008-308628 A | 12/2008 |
| | (Continued) | |

OTHER PUBLICATIONS

Office Action dated Oct. 8, 2021 in co-pending U.S. Appl. No. 16/282,373, 15 pages.

(Continued)

*Primary Examiner* — Matthew Luu
*Assistant Examiner* — Kendrick X Liu
(74) *Attorney, Agent, or Firm* — Oblon, McClelland, Maier & Neustadt, L.L.P.

(57) ABSTRACT

Separation lines are formed in a glass plate having first and second main surfaces by irradiating with laser light. The separation lines are configured of a product line corresponding to an outline of a glass article to be separated; and a release line. The product line includes a first in-plane void array configured of in-plane voids arranged on the first main surface; and internal void arrays for product line, each having an in-plane void. The release line includes internal void arrays for release line. A maximum length of the internal void array for product line $L_{1max}$ is equal to a maximum length of the internal void array for release line $L_{2max}$, and a minimum length of the internal void array for product line $L_{1min}$ is greater than a minimum length of the internal void array for release line $L_{2min}$; or the length $L_{1max}$ is greater than the length $L_{2max}$.

15 Claims, 8 Drawing Sheets

(51) Int. Cl.
    *B23K 26/53*     (2014.01)
    *B23K 26/55*     (2014.01)
    *B23K 26/0622*     (2014.01)
    *B23K 26/359*     (2014.01)
    *C03C 23/00*     (2006.01)
    *B23K 103/00*     (2006.01)

(52) U.S. Cl.
    CPC ............ *B23K 26/362* (2013.01); *B23K 26/38* (2013.01); *B23K 26/53* (2015.10); *C03C 23/0025* (2013.01); *B23K 2103/54* (2018.08)

(56) References Cited

U.S. PATENT DOCUMENTS

| | | |
|---|---|---|
| 2006/0246302 A1 | 11/2006 | Brady et al. |
| 2009/0040640 A1 | 2/2009 | Kim et al. |
| 2012/0047957 A1 | 3/2012 | Dannoux et al. |
| 2012/0135847 A1 | 5/2012 | Fukasawa et al. |
| 2012/0196071 A1 | 8/2012 | Cornejo et al. |
| 2013/0068505 A1 | 3/2013 | Hong et al. |
| 2013/0126573 A1 | 5/2013 | Hosseini et al. |
| 2014/0027951 A1* | 1/2014 | Srinivas ............... B23K 26/009 264/400 |
| 2014/0083983 A1 | 3/2014 | Zhang et al. |
| 2014/0147623 A1 | 5/2014 | Shorey et al. |
| 2014/0147624 A1 | 5/2014 | Streltsov et al. |
| 2014/0151370 A1 | 6/2014 | Chang et al. |
| 2014/0239552 A1 | 8/2014 | Srinivas et al. |
| 2014/0340730 A1* | 11/2014 | Bergh ............... B32B 17/10155 359/275 |
| 2015/0140735 A1 | 5/2015 | Hosseini |
| 2015/0165548 A1 | 6/2015 | Marjanovic et al. |
| 2015/0166393 A1 | 6/2015 | Marjanovic et al. |
| 2015/0235869 A1 | 8/2015 | Uehara |
| 2016/0009586 A1 | 1/2016 | Bookbinder et al. |
| 2016/0016257 A1 | 1/2016 | Hosseini |
| 2016/0059359 A1 | 3/2016 | Krueger et al. |
| 2016/0060156 A1 | 3/2016 | Krueger et al. |
| 2016/0200621 A1 | 7/2016 | N'Gom et al. |
| 2016/0318796 A1 | 11/2016 | Masuda |
| 2017/0174565 A1 | 6/2017 | Kase et al. |
| 2017/0197868 A1 | 7/2017 | Gupta et al. |
| 2018/0062342 A1 | 3/2018 | Comstock, II et al. |
| 2018/0186677 A1 | 7/2018 | Ito et al. |

FOREIGN PATENT DOCUMENTS

| | | |
|---|---|---|
| JP | 2009-120727 A | 6/2009 |
| JP | 2009-539743 A | 11/2009 |
| JP | 2011-510904 A | 4/2011 |
| JP | 2012-526721 A | 11/2012 |
| JP | 2013-536081 A | 9/2013 |
| JP | 2014-65624 A | 4/2014 |
| JP | 2014-531391 A | 11/2014 |
| JP | 2014-224892 A | 12/2014 |
| JP | 2015-156427 A | 8/2015 |
| JP | 2015-196716 A | 11/2015 |
| JP | 2015-534601 A | 12/2015 |
| JP | 2016-506351 A | 3/2016 |
| TW | 201433554 A | 9/2014 |
| WO | WO 2009/084398 A1 | 7/2009 |
| WO | WO 2011/002089 A1 | 1/2011 |
| WO | WO 2011/037167 A1 | 3/2011 |
| WO | WO 2012/153781 A1 | 11/2012 |
| WO | WO 2014/050798 A1 | 4/2014 |
| WO | WO 2014/161535 A2 | 10/2014 |
| WO | WO 2015/079849 A1 | 6/2015 |
| WO | WO 2015/080043 A1 | 6/2015 |
| WO | WO 2015/113024 A1 | 7/2015 |
| WO | WO 2015/113026 A2 | 7/2015 |
| WO | WO 2017/038853 A1 | 3/2017 |

OTHER PUBLICATIONS

International Search Report dated Mar. 6, 2018 in PCT/JP2018/002938 (with English translation), 4 pages.
Written Opinion dated Mar. 6, 2018 in PCT/JP2018/002937 filed Jan. 30, 2018.
International Search Report dated Mar. 6, 2018 in PCT/JP2018/002937, 4 pages (with English translation).
International Search Report (with English translation) and Written Opinion dated Oct. 31, 2017, in PCT/JP2017/028070 translation), 8 pages.
Written Opinion dated Mar. 6, 2018, in PCT/JP2018/002938, 3 pages.
International Search Report (with English translation) and Written Opinion dated Dec. 6, 2016, in PCT/JP2016/075475, 7 pages.
International Search Report (with English translation) and Written Opinion dated Oct. 11, 2016, in PCT/JP2016/075415, 7 pages.
Office Action dated Sep. 19, 2019, in co-pending U.S. Appl. No. 15/909,291, 12 pages.
Restriction requirement dated May 21, 2019, in co-pending U.S. Appl. No. 15/909,291, 7 pages.
Office Action dated Jul. 8, 2022, in related U.S. Appl. No. 17/075,368.

\* cited by examiner

GLASS PLATE AND MANUFACTURING METHOD OF GLASS PLATE

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2018/002937 filed on Jan. 30, 2018 and designating the U.S., which claims priority of Japanese Patent Application No. 2017-030506 filed on Feb. 21, 2017. The entire contents of the foregoing applications are incorporated herein by reference.

BACKGROUND OF THE INVENTION

1. Field of the Invention

The disclosure herein generally relates to a glass plate and a manufacturing method of a glass plate.

2. Description of the Related Art

Techniques for irradiating large-sized glass plates with laser light to form separation lines on the glass plates have been known in order to separate a plurality of pieces of glass from the glass plates, to obtain glass articles (e.g. glass products) (See, for example, U.S. Patent Application Publication No. 2015/0166393). In the technique, by irradiating the glass plate with laser light, separation lines are formed corresponding to a final shape of the glass articles. Then, the glass plate is cut along the separation lines, and thereby glass articles having desired shapes are obtained.

SUMMARY OF THE INVENTION

Technical Problem

The inventors of the present application found that the above-described glass plate, on which the separation lines are formed for separation, may be sometimes divided into pieces against an intention, before the predetermined separation step (in the following, referred to as a "pre-separation").

When the pre-separation occurs, there is a problem that the subsequent handling of the glass plate may become complicated, and a quality of glass articles may be degraded due to scratches or cracks on end faces of the glass articles.

The present invention was made in view of such a problem, and it is an object of the present invention to provide a glass plate, in which the pre-separation is less likely to occur. Moreover, it is an object of the present invention also to provide a manufacturing method of a glass plate, in which the pre-separation is less likely to occur.

Solution to Problem

The present invention provides a glass plate having a first main surface and a second main surface opposite each other,
a plurality of separation lines being formed in the glass plate and on the first main surface by irradiating the glass plate with laser light,
the separation lines being configured of at least one product line and at least one release line; the product line corresponding to an outline of a glass article to be separated and extracted from the glass plate; and the release line being a part of the separation lines other than the product line,
the product line including a first in-plane void array configured of a plurality of in-plane voids arranged on the first main surface; the product line further including a plurality of internal void arrays for product line, each having an in-plane void of the first in-plane void array, and extending from the first main surface toward the second main surface; and the internal void array for product line being configured of a plurality of internal voids for product line,
the release line including internal void arrays for release line, each of the internal void arrays for release line being arranged along a line connecting the first main surface and the second main surface; and the internal void array for release line being configured of a plurality of internal voids for release line, and
(i) a length of the internal void array for product line having a maximum length among the internal void arrays for product line $L_{1max}$ is equal to a length of the internal void array for release line having a maximum length among the internal void arrays for release line $L_{2max}$; and a length of the internal void array for product line having a minimum length among the internal void arrays for product line $L_{1min}$ is greater than a length of the internal void array for release line having a minimum length among the internal void arrays for release line $L_{2min}$, or
(ii) the length $L_{1max}$ is greater than the length $L_{2max}$.

Moreover, the present invention also provides a manufacturing method of a glass plate including
preparing a glass material having a first main surface and a second main surface opposite each other; and
irradiating the glass material with laser light to form separation lines,
the separation lines being configured of at least one product line and at least one release line; the product line corresponding to an outline of a glass article to be separated and extracted from the glass material; and the release line being a part of the separation lines other than the product line,
the product line including a first in-plane void array configured of a plurality of in-plane voids arranged on the first main surface; the product line further including a plurality of internal void arrays for product line, each having an in-plane void of the first in-plane void array, and extending from the first main surface toward the second main surface; and the internal void array for product line being configured of a plurality of internal voids for product line,
the release line including internal void arrays for release line, each of the internal void arrays for release line being arranged along a line connecting the first main surface and the second main surface; and the internal void array for release line being configured of a plurality of internal voids for release line, and
(i) a length of the internal void array for product line having a maximum length among the internal void arrays for product line $L_{1max}$ is equal to a length of the internal void array for release line having a maximum length among the internal void arrays for release line $L_{2max}$; and a length of the internal void array for product line having a minimum length among the internal void arrays for product line $L_{1min}$ is greater than a length of the internal void array for release line having a minimum length among the internal void arrays for release line $L_{2min}$, or
(ii) the length $L_{1max}$ is greater than the length $L_{2max}$.

In the manufacturing method, the glass material in the step (1) may be a glass material manufactured by a person who implements the above-described manufacturing method, or may be a glass material purchased from a third party.

Effect of Invention

According to an aspect of the present invention, a glass plate in which a pre-separation is less likely to occur is provided. Moreover, according to another aspect of the present invention, a manufacturing method of a glass plate, in which the pre-separation is less likely to occur, is also provided.

BRIEF DESCRIPTION OF THE DRAWINGS

Other objects and further features of embodiments will become apparent from the following detailed description when read in conjunction with the accompanying drawings, in which.

DETAILED DESCRIPTION OF THE PREFERRED EMBODIMENTS

In the following, embodiments for implementing the present invention will be described with reference to the accompanying drawings.

(Glass Plate in the Related Art)

In order to understand a configuration and a feature of the present invention, a glass plate in the related art will be briefly described with reference to FIG. 1.

Figure 1:
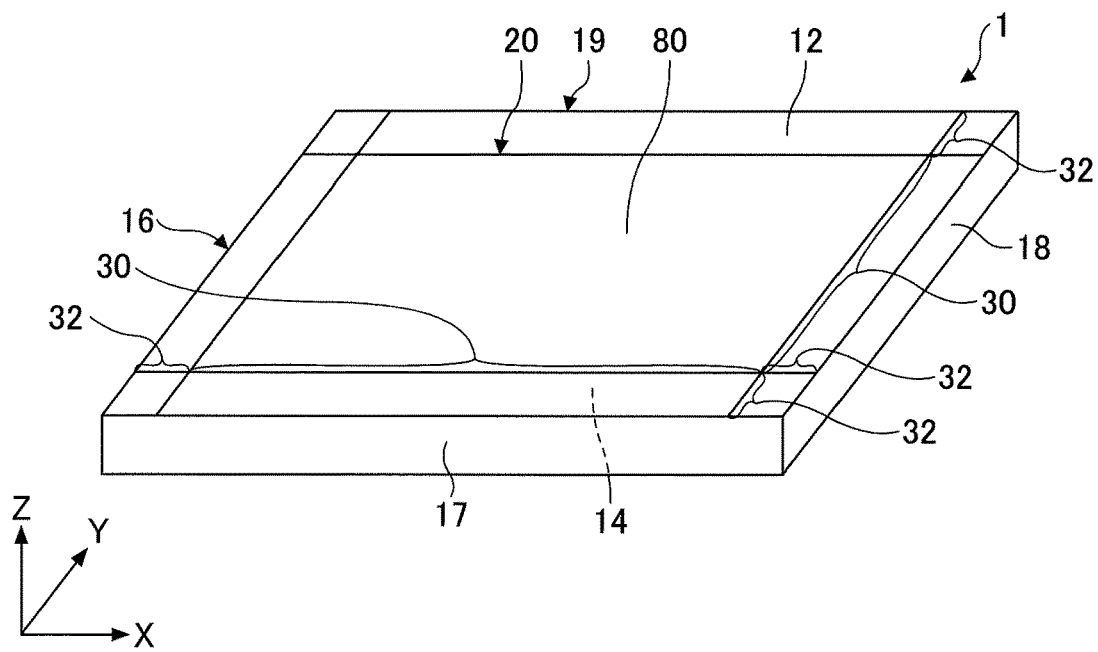
FIG. 1 is a perspective view schematically depicting a glass plate in the related art.

FIG. 1 is a perspective view schematically depicting the glass plate 1 in the related art.

As illustrated in FIG. 1, the glass plate 1 in the related art includes a first main surface 12 and a second main surface 14. The second main surface 14 is not viewable in FIG. 1. Moreover, the glass plate 1 in the related art has four end faces each connecting the first main surface 12 and the second main surface 14. In the following, the four end faces will be referred to as, in the counter clockwise direction, a first end face 16, a second end face 17, a third end face 18, and a fourth end face 19.

The glass plate 1 in the related art has two separation lines 20 extending in the long side direction of the glass plate 1 (X-axis direction) from the first end face 16 to the third end face 18 on the first main surface 12. Moreover the glass plate in the related art has two separation lines 20 extending in the short side direction of the glass plate 1 (Y-axis direction) from the second end face 17 to the fourth end face 19 on the first main surface 12.

The above-described separation lines 20 extending in the X-axis direction and in the Y-axis direction are formed by irradiating with laser light.

In the following, a structure of the separation line 20 will be described in detail with reference to FIG. 2.

Figure 2:
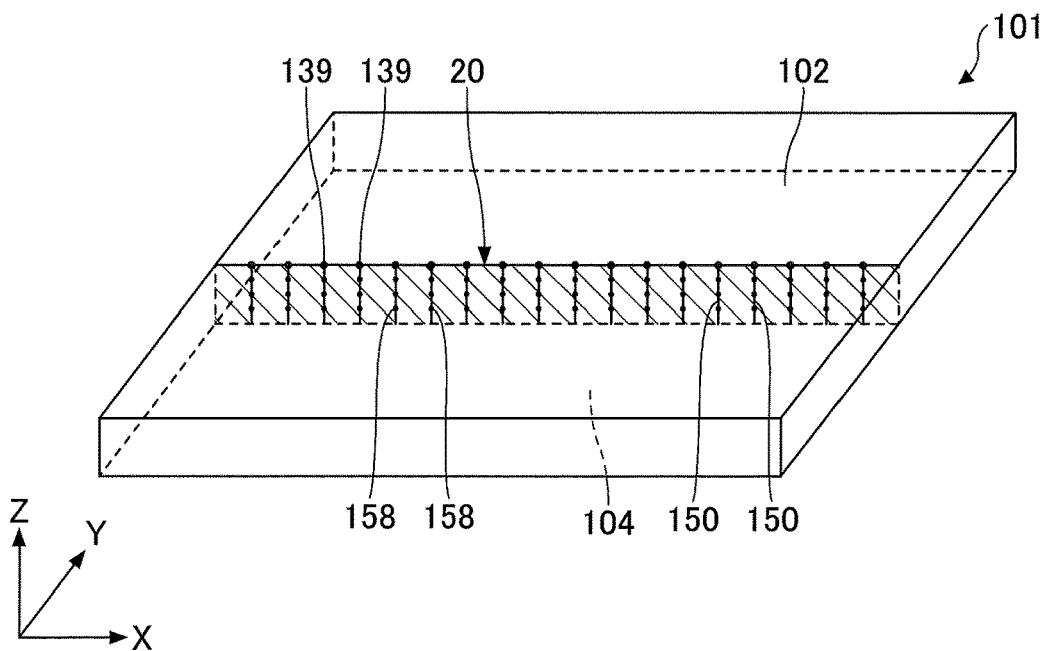
FIG. 2 is a diagram schematically depicting an example of a configuration of a separation line in the glass plate in the related art.

FIG. 2 is a diagram schematically depicting an example of a configuration of the separation line 20 formed on a glass material 101.

FIG. 2 shows that the glass material 101 has a first main surface 102 and a second main surface 104. In the example illustrated in FIG. 2, the separation line 20 is formed on a first main surface 102 of the glass material 101 and extends in the long side direction (X-axis direction).

The separation line 20 includes a plurality of in-plane voids 139 that are arranged in a predetermined array on the first main surface 102.

In the following, such an array of the in-plane voids 139 on the main surface, which may be any of the first main surface 102 and a second main surface 104, will be particularly referred to as an "in-plane void array".

Moreover, the separation line 20 has a plurality of "internal void arrays" 150 that extend in a plate thickness direction (Z-axis direction) from the first main surface 102 to the second main surface 104 of the glass material 101. Each of the internal void arrays 150 includes a plurality of internal voids 158 that are arranged in the plate thickness direction (Z-axis direction) from the first main surface 102. Each internal void array 150 has a corresponding in-plane void 139. Thus, each internal void array 150 extends below a corresponding in-plane void 139.

The above-described separation line 20 illustrated in FIG. 1 is formed so as to separate a glass article 80 from the glass plate 1 in the related art in the next operation. The separation line 20 forms an outline of the glass article 80 which will be separated in the next step.

The separation line 20 extending in the X-axis direction includes a part 30 corresponding to the outline of the glass article 80 extending in the X-axis direction (in the following, referred to as a "product line in the X-axis direction"); and release lines 32 extending in the X-axis direction. Similarly, the separation line 20 extending in the Y-axis direction includes a part 30 corresponding to the outline of the glass article 80 extending in the Y-axis direction (in the following, referred to as a "product line in the Y-axis direction"); and release lines 32 extending in the Y-axis direction.

In other words, the separation line 20 in the X-axis direction includes the product line in the X-axis direction 30 and the release lines 32 in the X-axis direction located on both ends of the product line in the X-axis direction 30. Similarly, the separation line 20 in the Y-axis direction includes the product line in the Y-axis direction 30 and the release lines 32 in the Y-axis direction located on both ends of the product line in the Y-axis direction 30.

The release lines 32 are arranged so as to facilitate easy separation of the glass article 80 from the glass plate 1 in the related art.

If the glass plate 1 in the related art is not provided with the release lines 32, a glass article 80 is separated from the glass plate 1 in the related art through a "cutout process". When the glass plate 1 in the related art is thick, in the process of separating the glass article 80 from the glass plate 1 in the related art in the plate thickness direction, a cut surface of the glass article 80 is easily caught by a cut surface of the glass plate 1, and thereby the separation process may be less likely to progress.

When the glass plate 1 in the related art is provided with the release lines 32, a glass article 80 is separated from the glass plate 1 in the related art through a "non-cutout process". Thus, the glass article 80 is easily separated from the glass plate 1 in the related art.

The inventors of the present application found that the glass plate 1 in the related art may be sometimes divided into a plurality of pieces before the predetermined separation step, and that in more severe cases the glass article 80 may be separated from the glass plate 1 during the handling of the glass plate 1 (in the following, referred to as a "pre-separation").

The pre-separation is likely to occur when a stress is applied to the glass plate 1 in the related art. For example, for the glass plate 1 in the related art, before the separation process of the glass article 80, various processes such as a conveyance process, a chemical tempering process, a deposition process and a washing process, may be performed. The pre-separation is likely to occur according to a heat load, a load of the own weight, or an influence of vibration or the like.

When the pre-separation occurs, there is a problem that the subsequent handling of the glass plate 1 may become complicated, and a quality of glass article 80 may be degraded due to scratches or cracks on end faces of the glass article 80.

In particular, the glass plate 1 in the related art has been originally used in order to solve the problem that the handling of a plurality of small glass articles 80 is complicated. However, when pre-separation occurs, the ability to leverage such a solution to the problem becomes lost.

(Glass Plate According to Embodiment of Present Invention)

Next, an example of a configuration of a glass plate according to an embodiment of the present invention will be described with reference to FIG. 3.

Figure 3:
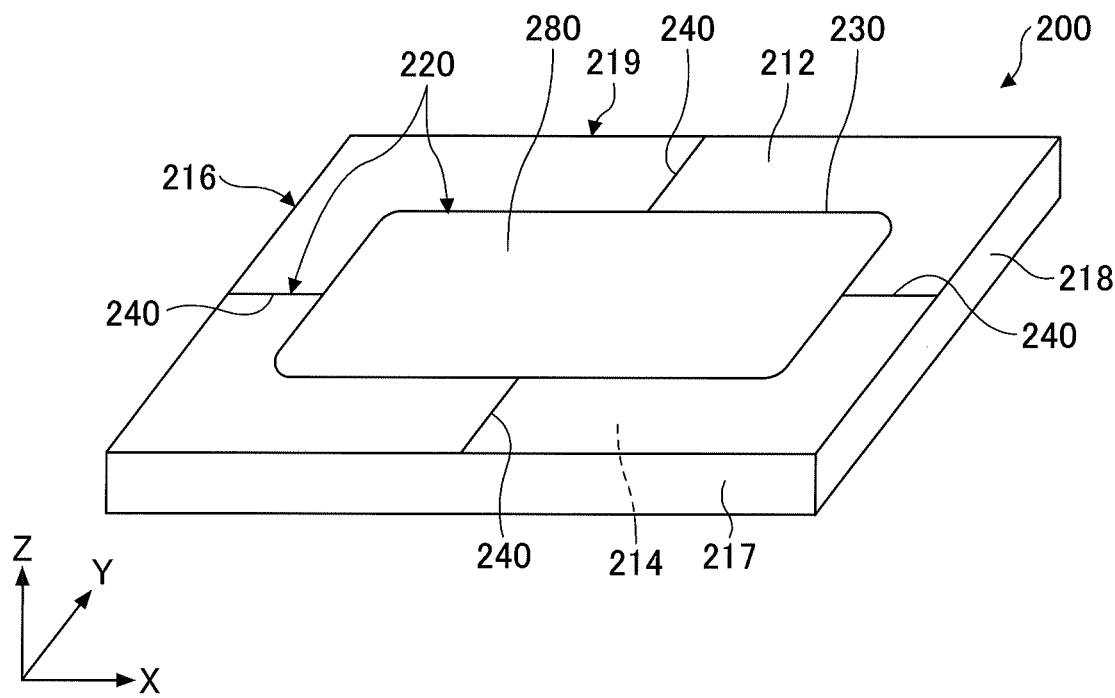
FIG. 3 is a perspective view schematically depicting an example of a glass plate according to an embodiment.

FIG. 3 is a perspective view schematically depicting a glass plate according to the embodiment of the present invention (in the following, referred to as a "first glass plate").

The first glass plate 200 illustrated in FIG. 3 includes a first main surface 212 and a second main surface 214 that face each other. However, the second main surface 214 is not viewable in FIG. 3. Moreover, the first glass plate 200 has four end faces connecting the first main surface 212 and the second main surface 214. In the following, the four end faces will be referred to as, in the counter clockwise direction, a first end face 216, a second end face 217, a third end face 218 and a fourth end face 219.

The first glass plate 200 has a rectangular shape in the top plan view. Thus, the first end face 216 and the third end face 218 face each other, and the second end face 217 and the fourth end face 219 face each other.

The first glass plate 200 has a plurality of separation lines 220 on the first main surface 212. The separation line 220 includes a product line and a release line, in the same way as in the glass plate 1 in the related art.

For example, FIG. 3 shows that the separation line 220 includes a product line 230 having a loop shape formed around the center of the first main surface 212; and four release lines 240 each extending in a longitudinal direction (Y-axis direction) or in a lateral direction (X-axis direction) from a point on the product line 230 to the end face.

The product line 230 corresponds to an outline of a glass article 280 which will be separated and extracted from the first glass plate 200 in the subsequent separation process. Thus, from the first glass plate 200 illustrated in FIG. 3, a glass article 280 having an approximately rectangular shape with four round corners is extracted after the separation process.

The separation lines 220 (i.e. the product line 230 and the release lines 240) are formed by irradiating the first glass plate 200 with laser light.

In the following, configurations of the product line 230 and the release line 240 will be described in detail with reference to FIGS. 4 to 7.

Figure 4:
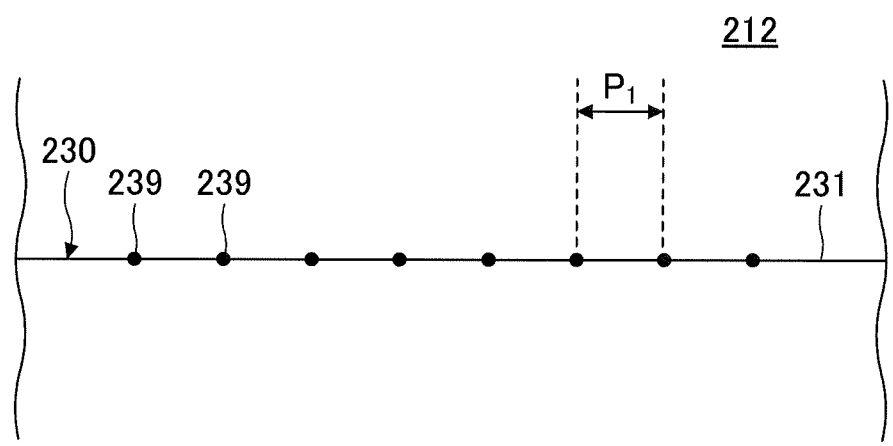
FIG. 4 is a top view schematically depicting an example of a part of a product line on the glass plate shown in FIG. 3.
Figure 5:
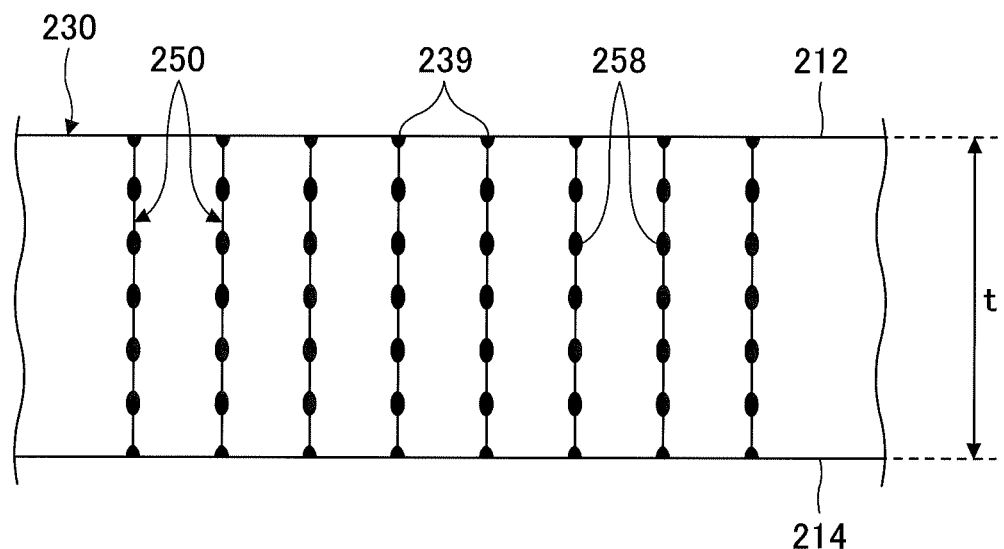
FIG. 5 is a cross-sectional view schematically depicting an example of a part of the product line in the glass plate shown in FIG. 3.

FIGS. 4 and 5 are diagrams depicting an example of a configuration of the product line 230. FIG. 4 is a plan view schematically depicting a part of the product line 230 formed on the first main surface 212 of the first glass plate 200. FIG. 5 is a cross-sectional view schematically depicting a part of the product line 230 in the first glass plate 200.

Figure 6:
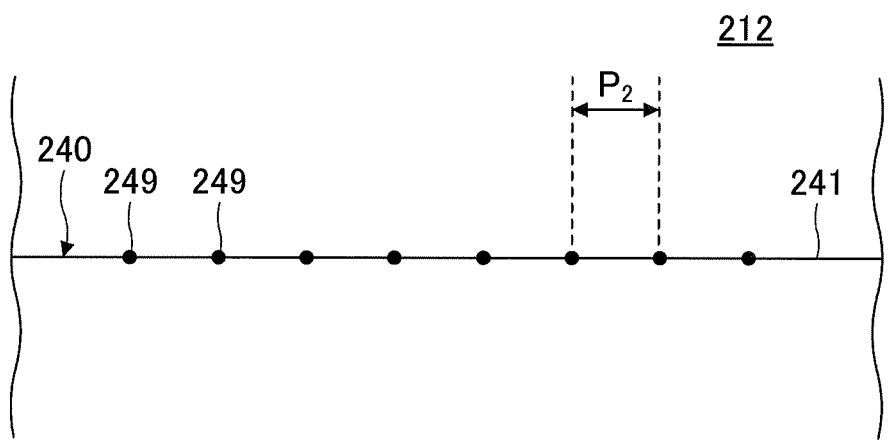
FIG. 6 is a top view schematically depicting an example of a part of a release line on the glass plate shown in FIG. 3.
Figure 7:
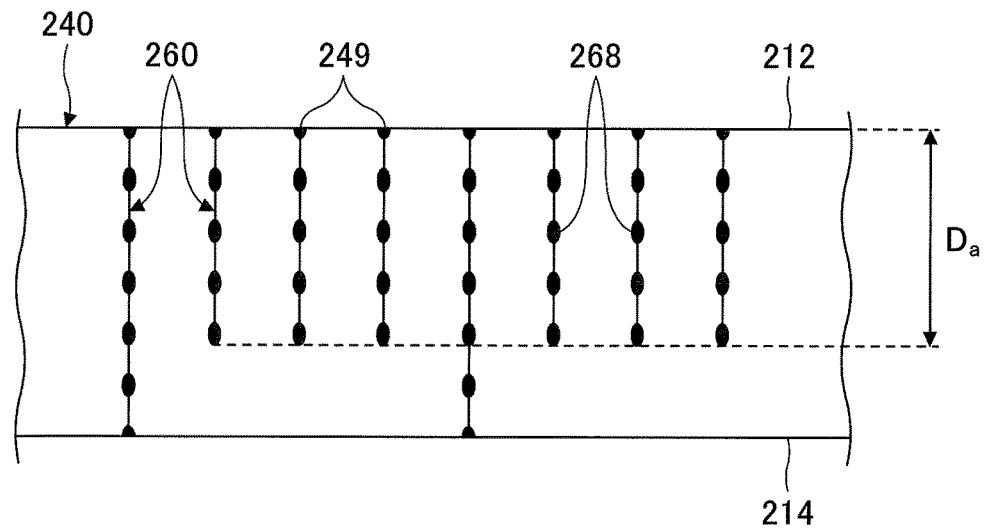
FIG. 7 is a cross-sectional view schematically depicting an example of a part of the release line in the glass plate shown in FIG. 3.

FIGS. 6 and 7 are diagrams depicting an example of a configuration of the release line 240. FIG. 6 is a plan view schematically depicting a part of the release line 240 formed on the first main surface 212 of the first glass plate 200. FIG. 7 is a cross-sectional view schematically depicting a part of the release line 240 in the first glass plate 200.

FIGS. 4 and 5 show that the product line 230 includes a first in-plane void array 231 on the first main surface 212. The first in-plane void array 231 is configured of a plurality of in-plane voids 239 arranged on the first main surface 212.

Moreover, the product line 230 includes a plurality of internal void arrays 250 (in the following, referred to as "internal void arrays for product line 250"), each extending from the first main surface 212 of the first glass plate 200 to the second main surface 214. Each internal void array for product line 250 has a corresponding in-plane void 239 of the in-plane void array 231. In other words, each internal void array for product line 250 extends below a corresponding in-plane void 239.

In the internal void array for product line 250, a plurality of internal voids 258 (in the following, referred to as "internal voids for product line 258") are arranged. In other words, the plurality of internal voids for product line 258 are arranged in a line, thereby the internal void array for product line 250 is formed.

The extension direction of the internal void array for product line 250 is not limited to the direction orthogonal to the first main surface 212. The internal void array for product line 250 may extend in a direction inclined from the thickness direction of the first glass plate 200.

FIGS. 4 and 5 show that a distance $P_1$ between centers of adjacent in-plane voids 239 (spacing of in-plane voids) in the first in-plane void array 231 in the product line 230 is the same for any of the in-plane voids 239. However, the embodiment is not limited to the above-described configuration, and the distance $P_1$ between centers of the adjacent in-plane voids 239 may vary depending on the in-plane void 239. The distance $P_1$ between centers of the adjacent in-plane voids 239 may be small, and the distance $P_1$ between centers of the other adjacent in-plane voids 239 may be great.

The distance $P_1$ between centers of the in-plane voids 239 is 10 µm at the maximum. The maximum distance $P_1$ between centers of the in-plane voids 239 preferably falls within a range of 1 µm to 10 µm, more preferably falls within a range of 3 µm to 8 µm, and further preferably falls within a range of 3 µm to 5 µm.

Moreover, the shape of the in-plane void 239 in the top plan view is not limited to a circle, as illustrated in FIG. 4. The shape of the in-plane void 239 may vary depending on the condition of irradiation and scanning of laser light. Similarly, the shape of the internal void for product line 258 in the internal void array for product line 250 viewed in the cross-sectional view is not limited to an ellipse, as illustrated in FIG. 5. The shape of the cross section of the internal void for product line 258 may vary depending on the condition of irradiation and scanning of laser light.

FIGS. 6 and 7 show that the release line 240 includes a second in-plane void array 241 on the first main surface 212. The second in-plane void array 241 is configured of a plurality of in-plane voids 249 arranged on the first main surface 212.

Moreover, the second in-plane void array 241 includes a plurality of internal void arrays 260 (in the following, referred to as "internal void arrays for release line 260"), each extending from the first main surface 212 of the first glass plate 200 to the second main surface 214. Each internal void array for release line 260 corresponds to the in-plane void 249. In other words, each internal void array for release line 260 extends below a corresponding in-plane void 249.

In the internal void array for release line 260, a plurality of internal voids 268 (in the following, referred to as "internal voids for release line 268") are arranged. In other words, the plurality of internal voids for release line 268 are arranged in a line, thereby the internal void array for release line 260 is formed.

The extension direction of the internal void array for release line 260 is not limited to the direction orthogonal to the first main surface 212. The internal void array for release line 260 may extend in a direction inclined from the thickness direction of the first glass plate 200.

In the embodiment of the present invention, a length of the internal void array for product line having the maximum length among the internal void arrays for product line will be denoted as $L_{1max}$, a length of the internal void array for product line having the minimum length among the internal void arrays for product line will be denoted as $L_{1min}$, a length of the internal void array for release line having the maximum length among the internal void arrays for release line will be denoted as $L_{2max}$, and a length of the internal void array for release line having the minimum length among the internal void arrays for release line will be denoted as $L_{2min}$. Then, the embodiment has a feature that relations expressed by the following formulas (1) and (2) are satisfied, i.e.

$L_{1max} = L_{2max}$, and (formula 1)

$L_{1min} > L_{2min}$. (formula 2)

For example, FIGS. 4 and 5 show that each of the total lengths of the internal void arrays for product line 250 (in the following, denoted as "$L_1$") is equal to the thickness t of the first glass plate 100. Thus, the total lengths $L_1$ of the internal void arrays for product line 250 are constant, i.e. $L_1 = L_{1max} = L_{1min}$.

FIGS. 6 and 7 show that a part of the internal void arrays for release line 260 penetrate from the first main surface 212 to the second main surface 214, and the other internal void arrays for release line 260 do not penetrate the second main surface 214.

Thus, the maximum total length $L_{2max}$ of the internal void array for release line 260 is equal to the thickness t of the first glass plate 100, and the minimum total length $L_{2min}$ (in the following, also denoted as $D_a$) of the internal void array for release line 260 is less than the thickness t of the first glass plate 200.

The internal void arrays in the first glass plate 200 satisfy the above-described formulas (1) and (2).

The length $D_a$ preferably falls within a range of 40% to 95% of the distance from the first main surface 212 to the second main surface 214, i.e. the thickness of the glass plate.

In the following descriptions, particularly the internal void array that does not penetrate the second main surface of the glass plate will be referred to as an "unpenetrating type internal void array". The internal void array that penetrates from the first main surface to the second main surface will be particularly referred to as a "penetrating type internal void array".

Following the above-described notation, part of the internal void arrays for release line 260, illustrated in FIG. 7, are "penetrating type internal void arrays". The other internal void arrays for release line 260 are "unpenetrating type internal void arrays". All the internal void arrays for product line 250, illustrated in FIG. 5, are "penetrating type internal void arrays".

When the product line 230 and the release lines 240 are formed so as to obtain the above-described feature, the glass article 280 is prevented from being unintentionally separated from the first glass plate 200 along the separation line 220 even if a stress is applied to the first glass plate 200, particularly to the separation line 220, i.e. the pre-separation is significantly prevented from occurring.

Thus, in the present application, the glass article 280 is separated from the first glass plate 200 in the predetermined process, i.e. the separation process. Moreover, the quality of the glass article 280 is prevented from being degraded due to scratches or cracks occurring on end faces of the glass article 280, when separated from the first glass plate 200 during handling of the first glass plate 200.

Also in the process of chemically tempering the first glass plate 200 having the separation line 220, the pre-separation is prevented from occurring.

Thus, according to the embodiment of the present invention, a glass plate in which a pre-separation phenomenon is less likely to occur is provided.

As long as the internal void arrays in the first glass plate 200 satisfy the above-described formulas (1) and (2), the product line 230 and the release line 240 may have any configurations.

For example, FIG. 5 shows that all the internal void arrays for product line 250 are penetrating type internal void arrays. However, the embodiment of the present invention is not limited to this. At least a part of the internal void arrays for product line 250 may be unpenetrating type internal void arrays.

FIG. 7 shows that the total lengths of the unpenetrating type internal void arrays among the internal void arrays for release line 260 are constant (length $D_a$). However, the embodiment of the present invention is not limited to this. The total lengths of the unpenetrating type internal void arrays may be different from each other.

In the configuration of the product line 230, illustrated in FIG. 5, in each of the internal void arrays for product line 250, the internal voids for product line 258 are arranged at substantially equal intervals. However, the embodiment of the present invention is not limited to this. The internal voids for product line 258 may be arranged at non-equal intervals in the internal void array for product line 250.

Similarly, in the configuration of the release line 240, illustrated in FIG. 7, in each of the internal void arrays for release line 260, the internal voids for release line 268 are arranged at substantially equal intervals. However, the embodiment of the present invention is not limited to this. The internal voids for release line 268 may be arranged at non-equal intervals in the internal void array for release line 260.

(Glass Plate According to Another Embodiment of Present Invention)

Next, an example of a configuration of a glass plate according to another embodiment of the present invention will be described with reference to FIGS. 8 to 10.

Figure 8:
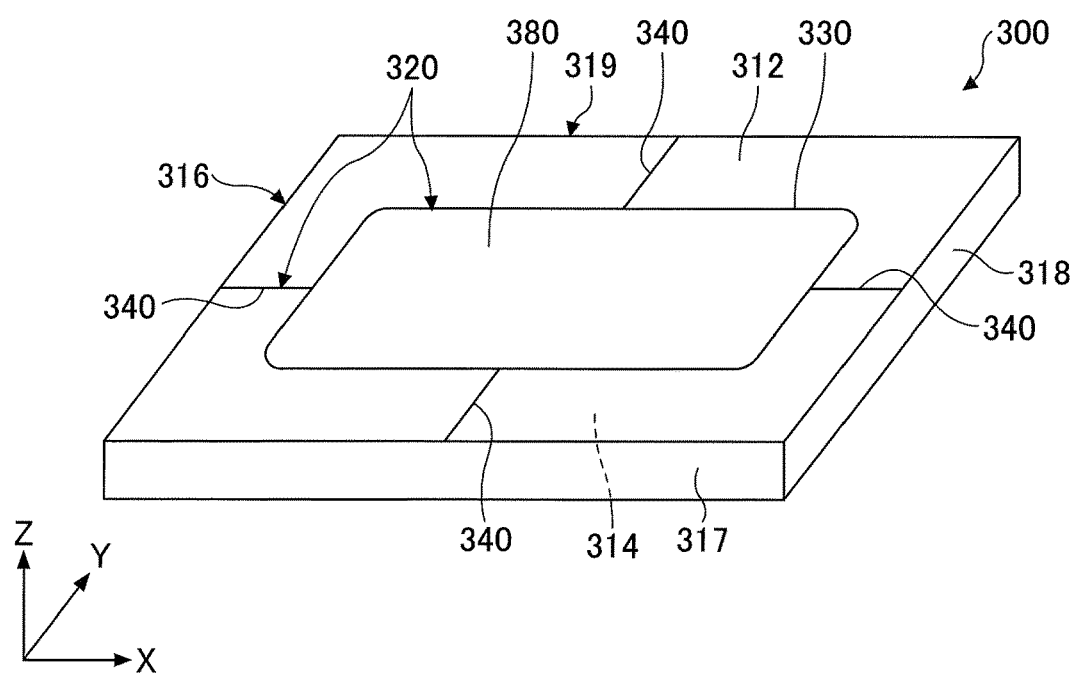
FIG. 8 is a perspective view schematically depicting another example of the glass plate according to the embodiment.

FIG. 8 is a perspective view schematically depicting a glass plate according to the embodiment of the present invention (in the following, referred to as a "second glass plate").

As illustrated in FIG. 8, the second glass plate 300 has substantially the same configuration as that of the above-described first glass plate 200.

That is, the second glass plate 300 has a rectangular shape in the top plan view, and includes a first main surface 312 and a second main surface 314 that are opposite each other. The second glass plate 300 has four end faces 316 to 319 connecting the first main surface 312 and the second main surface 314.

The second glass plate 300 has a plurality of separation lines 320 on the first main surface 312. The separation line 320 includes a product line 330 and a release line 340.

The product line 330 in the second glass plate 300 has the same configuration as the product line 230 in the first glass plate 200, illustrated in FIGS. 4 and 5. Thus, in order to indicate each member of the product line 330, the reference numeral used in FIGS. 4 and 5 will be used.

The release line 340 in the second glass plate 300 is formed by irradiating the glass plate with laser light. However, the release line 340 has a different configuration from the release line 240 in the first glass plate 200.

In the following, the configuration of the release line 340 will be described in detail with reference to FIGS. 9 and 10.

Figure 9:
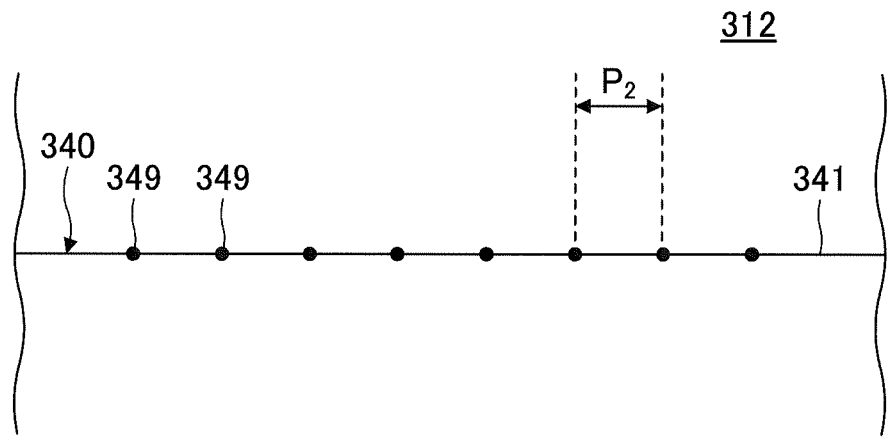
FIG. 9 is a top view schematically depicting an example of a part of a release line on the glass plate shown in FIG. 8.

FIG. 9 shows that the release line 340 includes a second in-plane void array 341 on the first main surface 312. The second in-plane void array 341 is configured of a plurality of in-plane voids 349 arranged on the first main surface 312.

Figure 10:
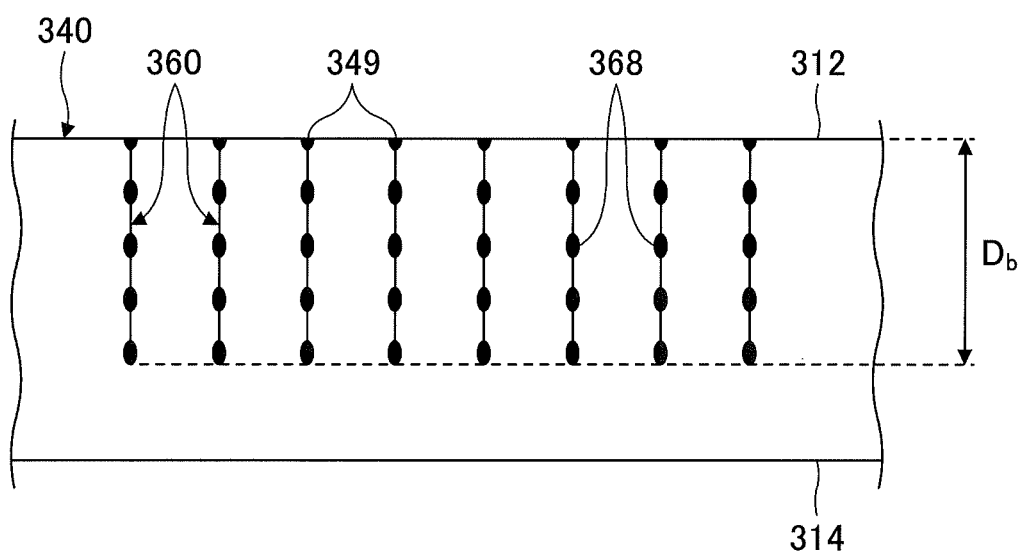
FIG. 10 is a cross-sectional view schematically depicting an example of a part of the release line configuring the release line in the glass plate shown in FIG. 8.

Moreover, FIG. 10 shows that the second in-plane void array 341 includes a plurality of internal void arrays 360 (in the following, referred to as "internal void arrays for release line 360"), each extending from the first main surface 312 of the second glass plate 300 towards the second main surface 314. Each internal void array for release line 360 corresponds to the in-plane void 349. In other words, each internal void array for release line 360 extends below a corresponding in-plane void 349.

In the internal void array for release line 360, a plurality of internal voids 368 (in the following, referred to as "internal voids for release line 368") are arranged. In other words, the plurality of internal voids for release line 368 are arranged in a line, thereby the internal void array for release line 360 is formed.

The extension direction of the internal void array for release line 360 is not limited to the direction orthogonal to the first main surface 312. The internal void array for release line 360 may extend in a direction inclined from the thickness direction of the second glass plate 300.

In the second glass plate 300, a length of the internal void array for product line having the maximum length among the internal void arrays for product line will be denoted as $L_{1max}$, and a length of the internal void array for release line having the maximum length among the internal void arrays for release line will be denoted as $L_{2max}$. Then, the embodiment has a feature that a relation expressed by the following formula (3) is satisfied, i.e.

$$L_{1max} > L_{2max}. \quad \text{(formula 3)}$$

For example, FIGS. 9 and 10 show that each internal void array for release line 360 does not penetrate the second main surface 314, and is an "unpenetrating type internal void array". Thus, a total length $L_2$ of each of the internal void arrays for release line 360 is less than a thickness t of the second glass plate 300. Moreover, the total lengths $L_2$ of the internal void arrays for release line 360 are the same length $D_b$.

Thus, internal void arrays in the second glass plate 300 satisfy the above-described formula (3).

The length $D_b$ preferably falls within a range of 40% to 95% of the distance from the first main surface 312 to the second main surface 314, i.e. the thickness of the glass plate t.

When the product line 330 and the release line 340 are formed so as to have the above-described configurations, the glass article 380 is prevented from being unintentionally separated from the second glass plate 300 along the separation line 320 even if a stress is applied to the second glass plate 300, particularly to the separation line 320, i.e. the pre-separation is significantly prevented from occurring.

Thus, in the present application, the glass article 380 is separated from the second glass plate 300 in the predetermined process, i.e. the separation process. Moreover, the quality of the glass article 380 is prevented from being degraded due to scratches or cracks occurring on end faces of the glass article 380, when separated from the second glass plate 300 during handling of the second glass plate 300.

The configuration of the release line 340, illustrated in FIG. 9 and FIG. 10 is merely an example, and the release line 340 may have another configuration.

Figure 11:
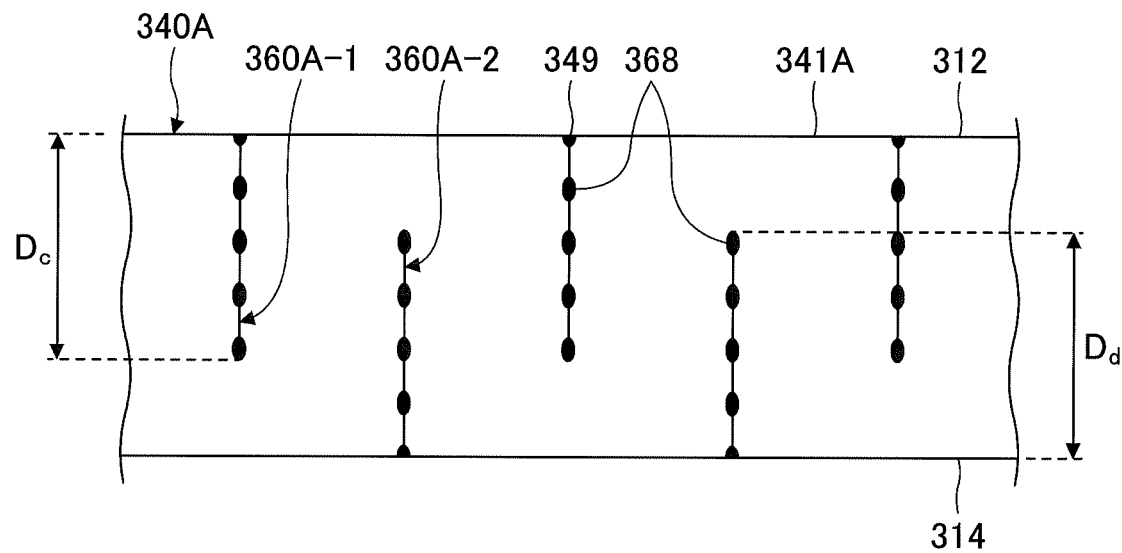
FIG. 11 is a cross-sectional view schematically depicting another aspect of the release line according to the embodiment.

FIG. 11 is a diagram schematically depicting another aspect of the release line. FIG. 11 is a cross-sectional view schematically depicting a part of the internal void array for release line.

FIG. 11 shows that the release line 340A includes a second in-plane void array 341A on the first main surface 312 of the glass plate. The release line 340A includes the "unpenetrating type internal void array" similar to the internal void array for release line 360 shown in FIG. 10.

The "unpenetrating type internal void arrays" arranged along the second in-plane void array 341A in the release line 340A alternate an internal void array that does not penetrate the first main surface 312 and an internal void array that does not penetrate the second main surface 314, different from the release line 340 illustrated in FIG. 10.

In the release line 340A, in an order of an internal void array for release line 360A-1 that does not penetrate the second main surface 314, an internal void array for release line 360A-2 that does not penetrate the first main surface 312, the internal void array for release line 360A-1 that does not penetrate the second main surface 314 . . . , internal void arrays for release line are arranged along the second in-plane void array 341A.

A length of a range of extension of the internal void array for release line 360A-1 in the thickness direction of the glass plate will be denoted by $D_c$, and a length of a range of extension of the internal void array for release line 360A-2 in the thickness direction will be denoted by $D_d$. The lengths $D_c$ and $D_d$ preferably fall within a range of 40% to 95% of the distance between the first main surface 312 and the second main surface 314 (i.e. the thickness of the glass plate t).

The lengths $D_c$ and $D_d$ are not required to be the same, and may be different from each other. The lengths $D_c$ of the internal void arrays for release line 360A-1 may be different from each other. The lengths $D_d$ of the internal void arrays for release line 360A-2 may be different from each other.

Also in the case of the release line 340A having the above-described configuration, the above-described formula (3) is satisfied, and the pre-separation is prevented from occurring.

The release line 340A, illustrated in FIG. 11, has the above-described configuration in which the internal void array for release line 360A-1 and the internal void array for release line 360A-2 are alternated along a predetermined direction. However, the pattern of alternating arrangement of the internal void array for release line 360A-1 and the internal void array for release line 360A-2 is not limited to this. For example, a plurality of internal void arrays for release line 360A-1 may be successively arranged followed by one internal void array for release line 360A-2 along a predetermined direction, a plurality of internal void arrays for release line 360A-2 may be successively arranged followed by one internal void array for release line 360A-1, or a plurality of internal void arrays for release line 360A-1 may be successively arranged followed by a plurality of internal void arrays for release line 360A-2.

Alternatively, the internal void array for release line 360A-1 and the internal void array for release line 360A-2 may be aperiodically arranged along a predetermined direction.

Figure 12:
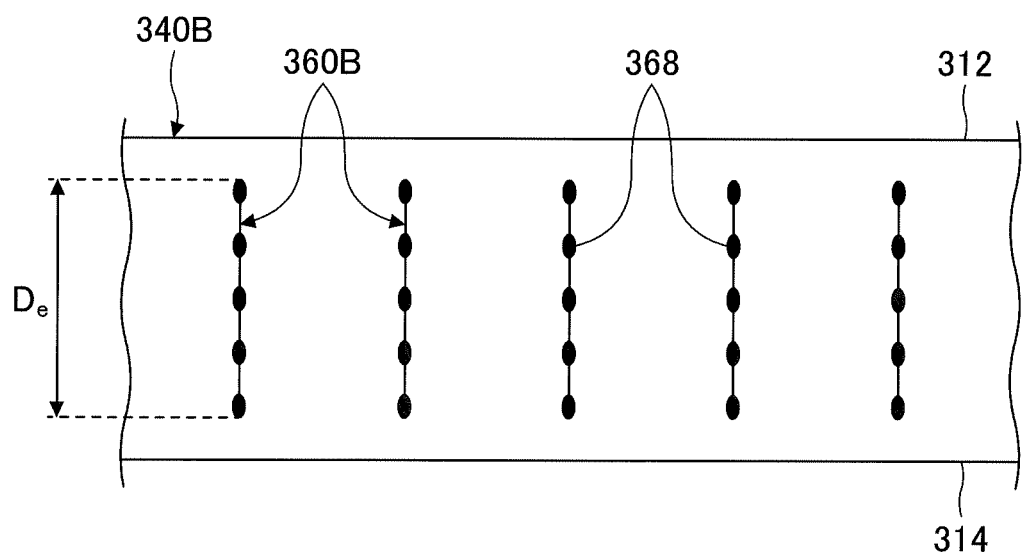
FIG. 12 is a cross-sectional view schematically depicting still another aspect of the release line according to the embodiment.

FIG. 12 is a diagram schematically depicting another aspect of the release line. FIG. 12 is a cross-sectional view schematically illustrating a part of the internal void arrays for release line.

FIG. 12 shows that the release line 340B does not include a second in-plane void array on either of the first main surface 312 or the second main surface 314 of the glass plate. An in-plane void is not present on either of the first main surface 312 or the second main surface 314.

Thus, the release line 340B is not viewable from the first main surface 312 side or the second main surface 314 side of the second glass plate 300. The release line 340B is a "virtual" line. The "virtual" release line 340B will be described later.

The release line 340B includes internal void arrays for release line 360B arranged on a plurality of lines connecting the first main surface 312 and the second main surface 314 in the second glass plate 300. The internal void array for release line 360B includes a plurality of internal voids for release line 368.

A length of a range of extension of the internal void array for release line 360B in the thickness direction of the glass plate, illustrated in FIG. 12, will be denoted by $D_e$. The length $D_e$ preferably falls within a range of 40% to 95% of the distance between the first main surface 312 and the second main surface 314 (i.e. the thickness of the second glass plate 300t).

Intervals between the adjacent internal voids for release line 368 in the internal void array for release line 360B are constant. Moreover, the intervals in all the internal void arrays for release line 360B are the same.

The embodiment of the present invention is not limited to this, and the intervals between the adjacent internal voids for release line 268 in the internal void array for release line 360B may be different from each other. Furthermore, the pattern of arrangement of the internal voids for release line 368 in the internal void arrays for release line 360B may be different from each other.

The release line 340B having the above-described configuration prevents the pre-separation from occurring.

As long as the internal void arrays in the second glass plate 300 satisfy the above-described formula (3), the product line 330 and the release line 340 may have any configurations.

For example, FIG. 10 shows that all the internal void arrays for release line 360 have the same total length $D_b$. However, the total lengths of the internal void arrays for release line 360 may be different from each other.

The minimum length of the internal void array for product line $L_{1min}$ may be greater than the minimum length of the internal void array for release line 360 $L_{2min}$, i.e.

$$L_{1min} > L_{2min},\qquad\text{(formula 4)}$$

or $L_{1min}$ may be equal to $L_{2min}$, i.e.

$$L_{1min} = L_{2min}.\qquad\text{(formula 5)}$$

In the configuration of the release line 340, illustrated in FIG. 10, in each of the internal void arrays for release line 360, the internal voids for release line 368 are arranged at substantially equal intervals. However, the embodiment of the present invention is not limited to this. The internal voids for release line 368 may be arranged at non-equal intervals in the interval void array for release line 360.

The same applies to the internal void arrays for release line 360A-1, 360A-2, and 360B, illustrated in FIG. 11 and FIG. 12.

In the configuration of the "virtual" release line 340B, illustrated in FIG. 12, an in-plane void is not present on the first main surface 312.

Moreover, in the configuration of the release line 340A, illustrated in FIG. 11, the in-plane voids 349 are present on the first main surface 312. However, the in-plane voids 349 correspond only to the internal void arrays for release line 360A-1. An in-plane void corresponding to the internal void array for release line 360A-2 is not present on the first main surface 312.

Thus, in a specific configuration of the internal void arrays for release line, in-plane voids 349 corresponding to the internal void arrays for release line may not be present in appearance on the first main surface 312.

In the present application, an in-plane void is assumed to be virtually present (in the following, referred to as a "virtual in-plane void") at a point where an extension line, extending in the thickness direction from the internal void array for release line included in the glass plate to the first main surface 312, crosses with the first main surface 312. Moreover, the "virtual in-plane voids" are assumed to be arranged, to form a second in-plane void array for release line.

When an in-plane void in the internal void array for release line is present on the first main surface 312, the in-plane void on the first main surface 312 is assumed to be a "virtual in-plane void" configuring a part of the second in-plane void array for release line.

According to the above-described assumption, even for the internal void array for release line, as illustrated in FIG. 11 or FIG. 12, the second in-plane void array and the "virtual in-plane voids" are properly arranged on the first main surface 312, corresponding to all the internal void arrays for release line.

As described above, the embodiment of the present invention has been described using the first glass plate 200 and the second glass plate 300 as examples.

The above-described configurations are merely examples. It is obvious for a person skilled in the art that in the glass plate according to the embodiment of the present invention the product line and the release line may have other configurations.

0122

For example, the configuration of the release line 240 in the first glass plate 200 can be combined with the configurations of the release lines 340, 340A, and 340B in the second glass plate 300.

For example, in the release line 240 illustrated in FIG. 7, the unpenetrating type internal void arrays may be "alternatingly arranged" as illustrated in FIG. 11. Alternatively, some of the unpenetrating type internal void arrays in the release line 240 illustrated in FIG. 7 may be unpenetrating type internal void arrays that do not have in-plane voids.

In addition to the embodiments, various variations of the embodiments may be present.

(Other Features)

Next, other features of the glass plate according to the embodiment of the present invention will be described using the first glass plate 200 as an example. It is obvious for a person skilled in the art that the following description can be applied directly or with a modification also to the second glass plate 300.

(First Glass Plate 200)

Compositions of the first glass plate 200 are not particularly limited. The first glass plate 200 may be made of, for example, a soda lime glass or an alkali aluminosilicate glass.

The shape of the first glass plate 200 is not particularly limited. The first glass plate 200 may have an approximately rectangular shape, or an approximately circular shape.

The thickness of the first glass plate 200 is not particularly limited. The thickness may fall within a range of 0.03 mm to 6 mm. When the first glass plate 200 is used in a building or a house, or installed in a vehicle, the thickness of the first glass plate 200 may fall within a range of 2 mm to 19 mm, for example.

The first glass plate 200 may be a chemically tempered glass. In this case, an end face of the glass article 280 separated from the first glass plate 200 is chemically tempered.

(Product Line 230)

The product line 230 illustrated in FIG. 3 has a shape of a single loop. The number of product lines 230 and the shape are not particularly limited to this. The product line 230 may include four lines, as illustrated in FIG. 1. Moreover, the product line 230 may have another shape.

FIG. 3 shows that one glass article 280 is extracted from one first glass plate 200. The embodiment is not limited to this, and a plurality of glass articles 280 may be extracted from one first glass plate 200.

FIG. 4 shows that the product line 230 includes the plurality of in-plane voids 239 on the first surface 212 of the first glass plate 200. The product line 230 may also include a plurality of in-plane voids on the second surface 214 of the first glass plate 200. In this case, the glass article 280 is more easily separated from the first glass plate 200.

As described above, the maximum distance $P_1$ between centers of the adjacent in-plane voids 239 is 10 μm or less.

Moreover, in the internal void array for product line 250, an interval between the adjacent internal voids for product line 258, i.e. a distance between a lower end of an upper internal void for product line 258 and an upper end of a lower internal void for product line 258, preferably falls within a range of 0 to 50 μm, more preferably 0 to 20 μm, and further preferably 0 to 10 μm. In this case, the glass article 280 is more easily separated from the first glass plate 200, and the end face of the glass article 280 becomes smoother.

(Release Line 240)

FIG. 3 shows that the release lines 240 include four lines each extending in a longitudinal direction (Y-axis direction) or in a lateral direction (X-axis direction) on the first main surface 212. The number and the shape of release lines are not particularly limited. The release lines 240 may include lines arranged on the same lines as the product lines 230. The release line 240 may include a curve or two or more curves. Moreover, the release line 240 may have another shape.

The release line 240 in the above-described example includes the plurality of in-plane voids 249 on the first main surface 212 of the first glass plate 200. The release line may also include a plurality of in-plane voids on the second surface 214 of the first glass plate 200.

In the above-described example, the distances $P_2$ between centers of adjacent in-plane voids 249 on the release line 240 are constant. However, this is merely an example, and the distance $P_2$ between centers of adjacent in-plane voids 249 may vary depending on the in-plane voids 249. For example, the distance $P_2$ between centers of adjacent in-plane voids 249 may be relatively small, and the distance $P_2$ between centers of the other adjacent in-plane voids 249 may be relatively great.

The distance $P_2$ between centers of adjacent in-plane voids 249 is 25 μm or less at the maximum. The distance $P_2$ between centers of adjacent in-plane voids 249 preferably falls within a range of 3 μm to 20 μm.

When the maximum value of the distance between centers $P_2$ is 20 μm or less, as described later in detail, by irradiating the first glass plate 200 with a $CO_2$ laser light along the separation line 220, the first glass plate 200 is separated at the positions of the product line 230 and the release line 240. Thus, in the separation process for the first glass plate 200, the problem that the glass article 280 cannot be properly separated from the first glass plate 200 is less likely to occur.

When the distances between centers $P_1$ of adjacent in-plane voids 239 on the product line 230 are constant and the distances between centers $P_2$ of adjacent in-plane voids 249 on the release line are constant, the distance $P_1$ and the distance $P_2$ may be substantially the same.

Furthermore, the shape of the in-plane void 249 in the top plan view is not limited to a circle, as illustrated in FIG. 6. The shape of the in-plane void 249 may vary depending on the condition of irradiation and scanning of laser light.

Furthermore, as described above, the in-plane void 249 may not be present on the release line 240.

Moreover, the shape of the internal void for release line 268 in the internal void array for release line 260 viewed in the cross-sectional view is not limited to an ellipse, as illustrated in FIG. 7. The shape of the cross section of the internal void for release line 268 may vary depending on the condition of irradiation and scanning of laser light.

(Manufacturing Method of Glass Plate According to Embodiment of Present Invention)

In the following, with reference to FIGS. 13 to 15, a manufacturing method of a glass plate according to an embodiment of the present invention will be described.

Figure 13:
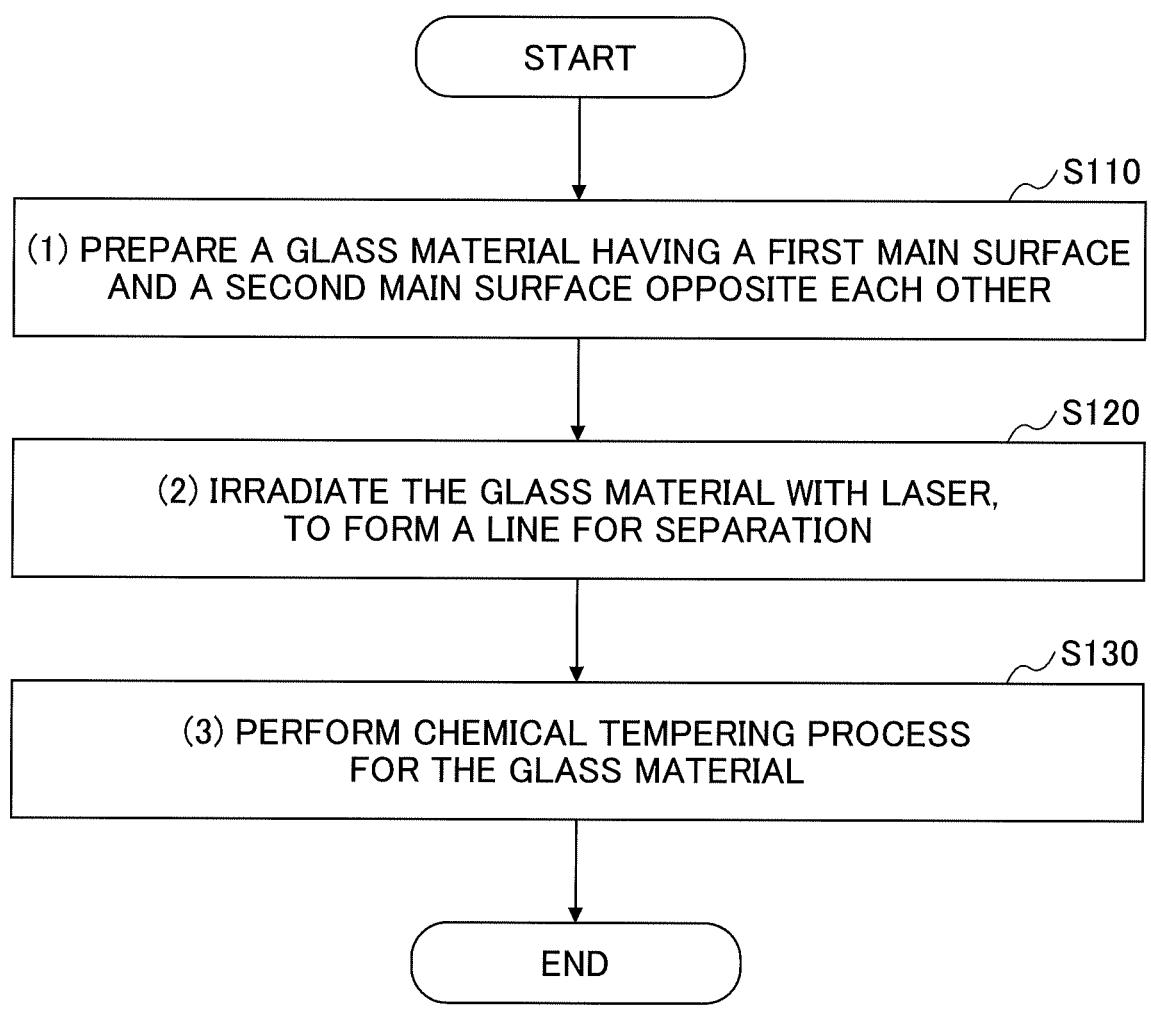
FIG. 13 is a flowchart schematically depicting an example of a flow of a manufacturing method of a glass plate according to the embodiment.

FIG. 13 is a flowchart schematically depicting an example of a flow of the manufacturing method of a glass plate according to the embodiment of the present invention (in the following, referred to as a "first manufacturing method").

FIG. 13 shows that the first manufacturing method includes:

(1) preparing a glass material having a first main surface and a second main surface opposite each other (step S110);

(2) irradiating the glass material with laser light to form a separation line in the glass material (step S120); and (3) performing a chemical tempering process for the glass material (step S130).

The process of step S130 in the first manufacturing method is not indispensable, and performed as necessary.

In the following, the processes (1) to (3) will be described in detail.

(Step S110)

A glass material is prepared. The glass material has a first main surface and a second main surface.

A composition of the glass material is not particularly limited. The glass material may be a soda lime glass, an alkali aluminosilicate glass or the like.

A thickness of the glass material is not particularly limited. The thickness may fall within a range of 0.03 mm to 6 mm, for example. When the glass material is used for a building or a house, or installed in a vehicle, the thickness of the glass material may fall within a range of 2 mm to 19 mm.

The glass material may be provided in a plate shape, or in a roll shape. A glass material of roll shape has an advantage of easy conveyance, compared with a glass material of plate shape. The first main surface and the second main surface of the glass material of plate shape are not necessarily flat, and may be curved.

A shape, viewed in the thickness direction, of the glass material of plate shape is not particularly limited. The glass material may have a rectangular shape, a circular shape, an elliptic shape or the like. In the following the glass material having a rectangular shape will be described as an example.

Figure 14:
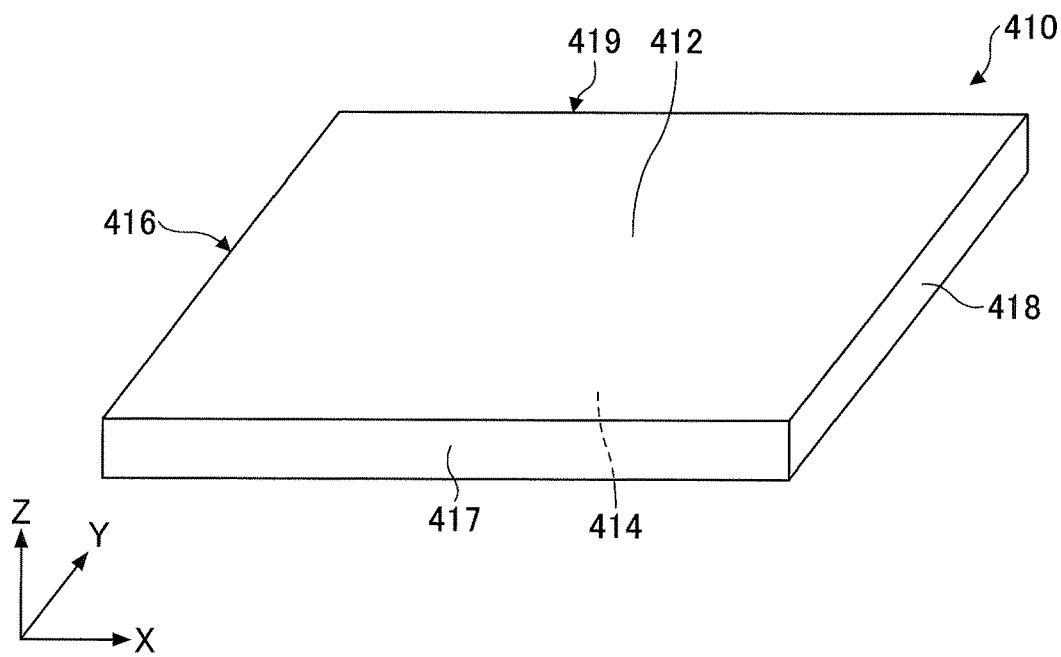
FIG. 14 is a perspective view schematically depicting an example of a glass material used in the manufacturing method of a glass plate according to the embodiment.

FIG. 14 is a perspective view schematically depicting the glass material having a rectangular shape.

FIG. 14 shows that the glass material 410 has a first main surface 412, a second main surface 414, and four end faces 416 to 419.

(Step S120)

The first main surface 412, for example, of the glass material 410 is irradiated with laser light. Thus, a separation line is formed on the first main surface 412 of the glass material 410.

Figure 15:
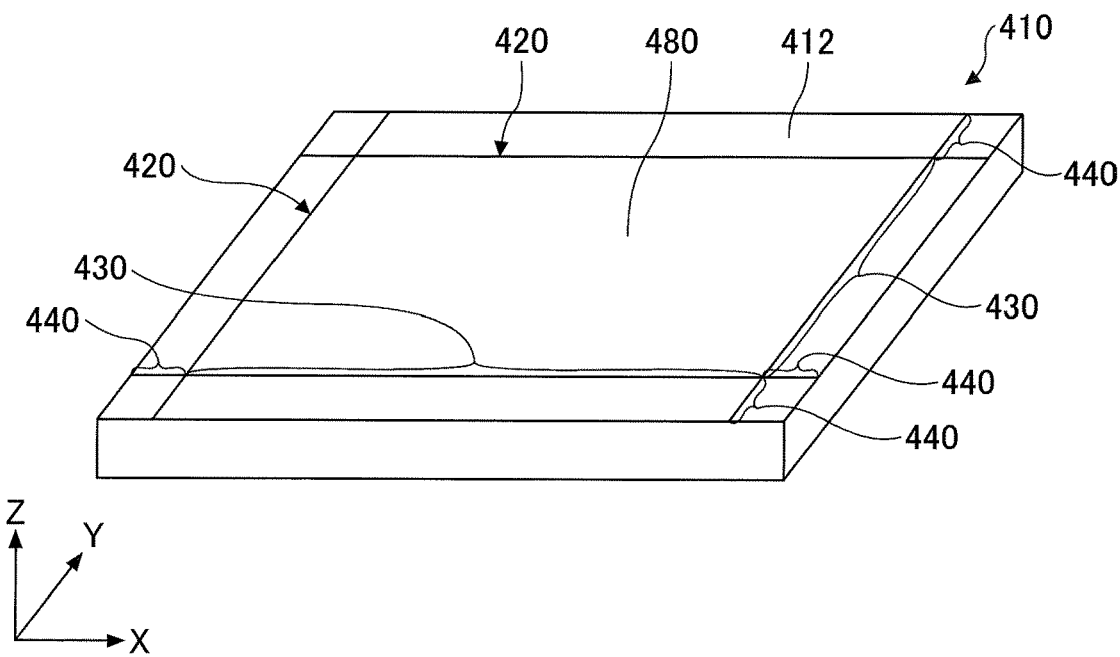
FIG. 15 is a diagram schematically depicting an example of a separation line formed on the glass material according to the embodiment.

FIG. 15 is a perspective view schematically depicting an example of the glass material 410 with a separation line 420 formed on the first main surface 412.

FIG. 15 shows that the separation line 420 includes the product line 430 and release lines 40.

As illustrated in FIG. 15, the product lines 430 include four lines extending in the longitudinal direction (Y-axis direction) or in the lateral direction (X-axis direction) formed approximately at the center of the first main surface 412. The release lines 440 include eight lines, each extending from an end of the product line 430 to any of the end faces 416 to 419 of the glass material 410. From approximately the central part of the glass material 410, on which the separation line 420 is formed, a glass article 480 defined by the product lines 430 is separated in the separation process, which will be described below.

As described above, the product line 430 includes a first in-plane void array formed by arranging a plurality of in-plane voids present on the first main surface 412; and an internal void array for product line extending in the plate thickness direction, with respect to each of the in-plane voids (not shown in FIG. 15).

The release line 440 according to the embodiment includes a second in-plane void array formed by arranging a plurality of in-plane voids present on the first main surface 412; and an internal void array for release line extending in the plate thickness direction, with respect to each of the in-plane voids (not shown in FIG. 15).

The shape of the separation line 420, i.e. the shape of the product line 430 and the shape of the release line 440 are not particularly limited. The release line 440 may not be viewable from outside, such as the release line 340B illustrated in FIG. 12.

As described above, a length of the internal void array for product line having the maximum length among the internal void arrays for product line will be denoted as $L_{1max}$, a length of the internal void array for product line having the minimum length among the internal void arrays for product line will be denoted as $L_{1min}$, a length of the internal void array for release line having the maximum length among the internal void arrays for release line will be denoted as $L_{2max}$, and a length of the internal void array for release line having the minimum length among the internal void arrays for release line will be denoted as $L_{2min}$. Then, the separation line 420 is formed so that the following formulas (1) and (2) are satisfied $$L_{1max} = L_{2max}, \text{ and} \qquad \text{(formula 1)}$$

$$L_{1min} > L_{2min}. \qquad \text{(formula 2)}$$

Alternatively, as described above, when the length of the internal void array for product line having the maximum length is denoted as $L_{1max}$ and the length of the internal void array for release line having the maximum length is denoted as $L_{2max}$, the separation line 420 is formed so that the following formula (3) is satisfied $$L_{1max} > L_{2max}. \qquad \text{(formula 3)}$$

A laser device for forming the separation line 420 is, for example, a short pulse laser device that emits a laser light with a pulse width of the order of femtoseconds to the order of nanoseconds, i.e. the range of $1.0 \times 10^{-15}$ to $9.9 \times 10^{-9}$ seconds. The short pulse laser light is preferably burst pulses. An average power of the laser light within an irradiation period is, for example, 30 W or more. When the average power of the short pulse laser light is less than 10 W, a sufficient internal void may not be formed. A short pulse laser device used for forming an internal void array is, for example, a burst laser device with a burst number of 3 to 10, a laser output power of about 90% of the rated output (50 W), a burst frequency of about 60 kHz, and a time width of burst that falls within a range of 20 picoseconds to 165 nanoseconds. The time width of burst preferably falls within a range of 10 nanoseconds to 100 nanoseconds.

A method of irradiating the glass material with laser light includes a method using a self-focusing phenomenon based on the Kerr-effect; a method using Gaussian Bessel beam with an axicon lens; a method using a linear focus forming beam by an aberration lens; or the like. A condition for irradiation with laser light is not particularly limited, as long as the separation line 420 is formed.

After the process of step S120, a glass plate having the separation line 420 is produced.

As described above, even if a stress is applied to the glass plate having the separation line 420 in an unintentional stage, a pre-separation is prevented from occurring.

Thus, the first manufacturing method provides a glass plate in which a pre-separation is less likely to occur.

(Step S130)

According to the processes of step S110 and S120 of the first manufacturing method, a glass plate according to the embodiment of the present invention is produced.

However, the first manufacturing method may include a chemical tempering process after the process of step S120.

A typical chemical tempering process is performed by immersing a glass material to be processed in a molten salt containing alkali metal ions. A temperature of the molten salt during the chemical tempering process falls within a range of 430° C. to 500° C., for example. The glass material is exposed to the molten salt at a high temperature.

Because the glass plate produced by the processes of step S110 and step S120 in the first manufacturing process has the above-described feature, a pre-separation is less likely to occur even if the glass plate is exposed to the molten salt at the high temperature in the chemical tempering process.

The above-described separation line 420 is formed, by irradiating with laser light, in the glass material 410 to be subjected to the chemical tempering process.

The inventors of the present application have found that, in the chemical tempering process for the glass material 410 having the product line 430 including an in-plane void array on the first main surface 412 (or the second main surface 414), a molten salt enters an internal void array for product line through the in-plane void array, and a region defined by the in-plane void array of the product line 430 and the internal void array for product line, i.e. an end face of the glass article 480, is also chemically tempered.

Thus, when the glass article 480 is separated from the chemically tempered glass plate, the end face of the glass article 480 is already chemically tempered.

The glass article 480 is separated and extracted from the glass plate produced by the first manufacturing method, in a separation process after the process of the first manufacturing method.

In the separation process, the glass article 480 is required to be properly separated from the glass plate. Thus, a $CO_2$ laser device is typically used in the separation process.

As described above, the maximum distance $P_{2max}$ between centers of the adjacent in-plane voids in the release line 440 is adjusted so as to fall within a range of 3 μm to 20 μm.

When the glass plate is irradiated with $CO_2$ laser light along the separation line 420, the glass plate is properly divided at the product line 430 and at the release line 440.

Thus, the problem that the glass article 480 cannot be separated from the glass plate in the separation process is less likely to occur for the glass plate produced by using the first manufacturing method.

As described above, in the manufacturing method for a glass plate according to the embodiment of the present invention, a glass plate, in which a pre-separation is less likely to occur, and from which a glass article is easily separated in a required process, i.e. the separation process, is produced.

REFERENCE SIGNS LIST 1 glass plate in the related art
12 first main surface
14 second main surface
16 first end face
17 second end face
18 third end face
19 fourth end face
20 separation line
30 product line
32 release line
80 glass article
101 glass material
102 first main surface
104 second main surface
139 in-plane void
150 internal void array
158 internal void
200 first glass plate
212 first main surface
214 second main surface
216 first end face
217 second end face
218 third end face
219 fourth end face
220 separation line
230 product line
231 first in-plane void array
239 in-plane void
240 release line
241 second in-plane void array
249 in-plane void
250 internal void array for product line
258 internal void for product line
260 internal void array for release line
268 internal void for release line
280 glass article
300 second glass plate
312 first main surface
314 second main surface
316 first end face
317 second end face
318 third end face
319 fourth end face
320 separation line
330 product line
340, 340A, 340B release line
341, 341A second in-plane void array
349 in-plane void
360, 360A-1, 360A-2, 360B internal void array for release line
368 internal void for release line
380 glass article
410 glass material
412 first main surface
414 second main surface
416 to 419 four end faces
420 separation line
430 product line 440 release line
480 glass article

What is claimed is:

1. A glass plate having a first main surface and a second main surface opposite each other,
   a plurality of separation lines being formed in the glass plate and on the first main surface by irradiating the glass plate with laser light,
   the separation lines being configured of at least one product line and at least one release line; the at least one product line corresponding to an outline of a glass article to be separated and extracted from the glass plate; and the at least one release line being a part of the separation lines other than the at least one product line,
   the at least one product line including a first in-plane void array configured of a plurality of in-plane voids arranged on the first main surface; the at least one product line further including a plurality of internal void arrays for product line, each having an in-plane void of the first in-plane void array, and extending from the first main surface toward the second main surface; and each of the plurality of the internal void arrays for product line being configured of a plurality of internal voids for product line,
   the at least one release line including an internal void array for release line arranged along each of a plurality of lines connecting the first main surface and the second main surface; and the internal void array for release line being configured of a plurality of internal voids for release line, and
   (i) a length of each of the plurality of the internal void arrays for product line having a maximum length among the internal void arrays for product line $L_{1max}$ is equal to a length of the internal void arrays for release line having a maximum length among internal void arrays for release line $L_{2max}$; and a length of each of the plurality of the internal void arrays for product line having a minimum length among the internal void arrays for product line $L_{1min}$ is greater than a length of the internal void array for release line having a minimum length among internal void arrays for release line $L_{2min}$, or (ii) the length $L_{1max}$ is greater than the length $L_{2max}$.

2. The glass plate according to claim 1,
   wherein (ii) the length $L_{1max}$ is greater than the length $L_{2max}$, and
   wherein the length $L_{1min}$ is greater than $L_{2min}$.

3. The glass plate according to claim 1,
   wherein a distance $P_1$ between centers of the in-plane voids of the first in-plane void array adjacent to each other falls within a range of 1 µm to 10 µm.

4. The glass plate according to claim 1,
   wherein a distance $P_2$ between centers of virtual in-plane voids adjacent to each other falls within a range of 3 µm to 25 µm, the virtual in-plane void is a position at which an extension line extended from the internal void array for release line crosses the first main surface, or the virtual in-plane void is a void in the internal void array for release line on the first main surface when the void is located on the first main surface.

5. The glass plate according to claim 1,
   wherein at least one of the internal void arrays for release line has an in-plane void on the first main surface.

6. The glass plate according to claim 5,
   wherein at least one of the internal void arrays for release line has an in-plane void on the first main surface and an in-plane void on the second main surface.

7. The glass plate according to claim 5,
   wherein the internal void arrays for release line include a first internal void array for release line, a second internal void array for release line, and a third internal void array for release line, arranged along a predetermined direction in the first main surface in this order, and
   wherein the first internal void array for release line has an in-plane void on the first main surface and does not have an in-plane void on the second main surface; the second internal void array for release line does not have an in-plane void on the first main surface and has an in-plane void on the second main surface; and the third internal void array for release line has an in-plane void on the first main surface and does not have an in-plane void on the second main surface.

8. The glass plate according to claim 1,
   wherein the at least one release line includes a second in-plane void array on the first main surface, and
   wherein the internal void arrays for release line have in-plane voids on the first main surface, the in-plane voids of the internal void arrays configuring the second in-plane void array.

9. The glass plate according to claim 8,
   wherein the in-plane voids configuring the second in-plane void array are arranged at substantially equal intervals on the first main surface.

10. The glass plate according to claim 1,
    wherein the in-plane voids configuring the first in-plane void array are arranged at substantially equal intervals on the first main surface.

11. The glass plate according to claim 1,
    wherein each of the internal void arrays for product line has an in-plane void on the second main surface.

12. The glass plate according to claim 1,
    wherein the separation lines include a curved part or are substantially configured of straight lines.

13. The glass plate according to claim 1,
    wherein the glass plate is chemically tempered.

14. A manufacturing method of a glass plate comprising:
    preparing a glass material having a first main surface and a second main surface opposite each other; and
    irradiating the glass material with laser light to form separation lines,
    the separation lines being configured of at least one product line and at least one release line; the at least one product line corresponding to an outline of a glass article to be separated and extracted from the glass material; and the at least one release line being a part of the separation lines other than the at least one product line,
    the at least one product line including a first in-plane void array configured of a plurality of in-plane voids arranged on the first main surface; the at least one product line further including a plurality of internal void arrays for product line, each having an in-plane void of the first in-plane void array, and extending from the first main surface toward the second main surface; and each of the plurality of the internal void arrays for product line being configured of a plurality of internal voids for product line,
    the at least one release line including an internal void array for release line arranged along each of a plurality of lines connecting the first main surface and the second main surface; and the internal void array for release line being configured of a plurality of internal voids for release line, and (i) a length of each of the plurality of the internal void arrays for product line having a maximum length among the internal void arrays for product line $L_{1max}$ is equal to a length of the internal void array for release line having a maximum length among internal void arrays for release line $L_{2max}$; and a length of each of the plurality of the internal void arrays for product line having a minimum length among the internal void arrays for product line $L_{1min}$ is greater than a length of the internal void array for release line having a minimum length among the internal void arrays for release line $L_{2min}$, or (ii) the length $L_{1max}$ is greater than the length $L_{2max}$.

15. The manufacturing method of a glass plate according to claim 14 further comprising:

performing a chemical tempering process for the glass material after irradiating the glass material with laser light.

\* \* \* \* \*